United States Patent Office 3,468,821
Patented Sept. 23, 1969

3,468,821
SPONGE BALLS AND THEIR MANUFACTURE
Kenneth R. Behrendsen, Ashland, Ohio, assignor to Eagle Rubber Co., Inc., a corporation
No Drawing. Filed Apr. 11, 1966, Ser. No. 547,067
Int. Cl. C08d 13/10; A63b 37/00
U.S. Cl. 260—2.5
2 Claims

ABSTRACT OF THE DISCLOSURE

The invention relates to a sponge ball of pre-masticated vulcanized linear polyisoprene having a density of 21 to 32 lbs. per cubic foot and a rebound of at least 65 percent, and the process of making it.

---

This invention refers to play balls of sponge linear polyisoprene and their manufacture.

The sponge of this invention is made from a pre-masticated linear polyisoprene and has exceptional resilience so that balls made from it have a greater rebound than sponge balls of the prior art. Such prior-art balls, generally made of neutral rubber, have a density of about 38 pounds per cubic foot or greater, and the rebound when dropped from a height of 72 inches onto a hard surface is about 50 to 55 percent. Usually they contain 125 parts or more of reinforcing material on 100 parts of rubber.

The balls of this invention have an unexpectedly high rebound, being at least 65 percent when dropped on a hard surface from a height of 72 inches, and generally in the neighborhood of 72 to 75 percent. They have a lower density, in the range of up to 32 pounds, and preferably within the range of 21 or 25 to 30 pounds, per cubic foot, and the content of reinforcing agent is generally less—being in the neighborhood of 20 to 100 parts, or preferably about 30 to 50 parts.

Although in preparing the balls of this invention any linear polyisoprene may be employed, the Ziegler-type polyisoprenes are preferred. They will be vulcanized with any usual vulcanizing materials, preferably employing sulfur with an accelerator, and an antioxidant will normally be included. The specific gravity of the compounded, uncured polyisoprene before blowing, is in the neighborhood of 1.10 to 1.40, whereas the unblown, uncured compounded natural rubber previously used usually had a specific gravity in the range of 1.30 to 1.45.

It has been found that a ball of improved resilience is produced by pre-masticating the polyisoprene on a mill or in an internal mixer with a peptizing agent present, and then allowing the pre-masticated stock to stand until the peptizing agent has effected the desired reduction in plasticity. It will be appreciated that inert compounding ingredients may be mixed into the rubber during the pre-mastication, and this in turn will affect the plasticity as given herein. The polyisoprene, if no compounding ingredients have been added during the pre-mastication, will usually be pre-masticated to a Williams plastometer reading from about 80 to 100, although this may be varied. After pre-masticating, compounding ingredients are added with further processing, as by open-mill mixing or internal mixing. The usual amount of sulfur is employed, namely, about 2 to 4 parts, and the rubber is advantageously plasticized with a processing oil using from 2 to 15 parts. The amount of accelerator may be varied as is well known in the art, and normally from about .75 to 3.00 parts of accelerator will be used. It is advantageous to employ an antioxidant, and this may be used in any usual amount as, for example, between 0.25 and 1 part.

Any usual blowing agent may be employed, such as ammonium bicarbonate, sodium bicarbonate, urea, di-nitrosopentamethylenetetramine, p,p' - oxybis(benzene-sulfonylhydrazide), and others well known in the art. Usually, from 4 to 15 parts will be used but this may be varied. The preferred blowing agent is a mixture of sodium bicarbonate and p,p'-oxybis(benzenesulfonylhydrazide). An acid material such as salicylic acid or phthalic anhydride will usually be added to retard the acceleration so that the completion of the cure is delayed until after the blowing has been effected.

The compounded rubber is heated in any manner to create the sponge and to cure the polyisoprene. This may be done in a ball mold of any usual size, usually 1 or 2 to 4 inches in diameter, preferably with steam heating. For larger balls, radio-frequency heating may be employed to pre-heat and/or cure the stock in order to shorten the cure time and thus obtain a more uniform cure and cell structure.

The reinforcing agents that may be employed usually include calcium carbonate (both precipitated and natural ground). For a light-colored ball, non-staining accelerator and antioxidant will be used, and titanium dioxide will often be used, both as a reinforcing agent and coloring pigment. Other reinforcing agents that may be employed include those well known, such as anhydrous aluminum silicate (Burgess clay), blacks such as fast extrusion furnace black (FEF Black), hydrated sodium, silico aluminate (precipitated). The amount of reinforcing agent employed is relatively small compared with that formerly used and will usually total between 20 and 100 parts per 100 parts of polyisoprene. Any desired coloring pigment may be added.

The invention is further illustrated by the following examples:

Example I

One hundred parts of Ziegler-type linear polyisoprene (Natsyn 200) is broken down with a small amount of peptizing agent such as 0.4 part of Pepton 65B (60% zinc 2-benzamidothiphenate+40% inert carriers and de-dusting agent). The pre-mastication is started at about 140 to 150° F. and the stock is dumped after about 8 minutes at which time it has reached a temperature in excess of 260° F. and preferably about 295° F. It is then stored a minimum of 8 hours to allow the peptizing action to continue, and the Williams plastometer reading is then about 90.

The rubber is then compounded by adding the following ingredients to 100.40 parts of the pre-masticated polyisoprene:

| | Parts |
|---|---|
| Accelerator [1] | 2.0 |
| Zinc oxide | 10 |
| Stearic acid | 4 |
| Processing aids [2] | 11.25 |
| Antioxidant [3] | 0.50 |
| Filler [4] | 40 |
| Blowing agent [5] | 6.5 |
| Sulfur | 3 |

[1] There are many accelerators that may be used. 0.50 part of diphenylguanidine and 1.50 parts of mercaptobenzothiazole may be used.
[2] Usual processing aids may be employed, including naphthenic oils, paraffinic oils, paraffin, etc. 1.25 parts of paraffin with 10 parts of processing oil has been found satisfactory. Usually less than 1.5 parts of paraffin will be used, and the amount of processing oil may vary between 2 and 15 parts.
[3] Usual antioxidants may be employed in the amount of 0.25 to 1.0 part, for example. A usual antioxidant will be 2,2'-methylene-bis(4-methyl-6-tertiary butylphenol).
[4] Usually calcium carbonate in some form will be employed. 25 parts of natural ground calcium carbonate (such as C–55) with 10 parts of precipitated calcium carbonate (such as MULTIFLEX MM) may be used satisfactorily with 15 parts of titanium dioxide in the manufacture of white balls.
[5] Different blowing agents may be used, a very satisfactory blowing agent being 0.5 part of p,p'-oxybis(benzenesulfonyl-hydrazide) with 6 parts of sodium bicarbonate.

The compounded stock was added to a mold 2¾ inches in diameter and cured by heating 76 minutes with the top of the mold at 295° F. and the bottom at 280° F.

Sponge balls made according to the foregoing formula had a rebound of 72 to 75 percent when dropped on a smooth surface from a height of 72 inches.

Coloring pigments may be added as desired, to produce different color effects. For the production of dark-colored products the use of non-staining materials is not essential.

Example II

The polyisoprene employed in this example is the Ziegler-type polyisoprene marketed as Natsyn 2200. It was peptized with Endor (zinc salt of pentachlorothiophenol, activated). The following formula illustrates a specific compounding procedure. The general process is the same as previously indicated.

| | Parts per 100 parts of polymer |
|---|---|
| Natsyn 2200 | 100.00 |
| Endor | .40 |
| Santocure (N'-cyclohexyl-2-benzothiazole-sulfenamide) | 1.50 |
| DoTG (di-ortho-tolylguanidine) | 0.50 |
| Zinc oxide | 10.00 |
| Stearic acid | 4.00 |
| Retarder PD (phthalic anhydride with modifier and antidust agent) | 2.75 |
| Paraffin | 1.25 |
| Naugawhite-alkylated bis-phenol | 0.50 |
| #10 white CaCo₃ | 25.00 |
| Witcarb RC CaCo₃ (ppt.) | 10.00 |
| Titanox amo (titanium dioxide) | 15.00 |
| Unicel ND (40% N,N'-dinitrosopentamethylene-tetramine+60% inert filler) | 0.50 |
| Sodium bicarbonate | 6.00 |
| #511 rubber process oil (paraffinic type, non-staining) | 10.00 |
| Sulfur | 3.00 |

The invention is covered in the claims that follow.

I claim:

1. A sponge ball of vulcanized linear polyisoprene pre-masticated to a Williams plastometer of 80 to 100, having a density of 21 to 32 pounds per cubic foot and a rebound of at least 65 percent.

2. The method of producing a sponge rubber ball from a linear polyisoprene which comprises:
 (a) pre-masticating the polyisoprene to produce a polymer with a Williams plastometer of 80 to 100,
 (b) compounding the same with vulcanizing ingredients, a blowing agent and 20 to 100 parts of reinforcing agent per 100 parts of polyisoprene, to produce a composition with a specific gravity of 1.10 to 1.40, and
 (c) then in a ball mold heating to blow and vulcanize the compounded polyisoprene to a density of 25 to 30 pounds per cubic foot.

References Cited

UNITED STATES PATENTS

| 1,345,904 | 8/1920 | Wishart | 273—58 |
| 2,901,446 | 8/1959 | Hawkins | 260—2.5 |
| 2,927,904 | 3/1960 | Cooper | 260—2.5 |

FOREIGN PATENTS 856,735  12/1960  Great Britain.

MURRAY TILLMAN, Primary Examiner

M. FOELAK, Assistant Examiner

U.S. Cl. X.R.

260—41.5; 273—58